United States Patent [19]
Willmann et al.

[11] Patent Number: 5,234,264
[45] Date of Patent: Aug. 10, 1993

[54] BRAKE SYSTEM

[75] Inventors: Karl-Heinz Willmann, Freiberg/N; Wolf-Dieter Jonner, Beilstein Schmidhausen, both of Fed. Rep. of Germany

[73] Assignee: Robert Bosch GmbH, Stuttgart, Fed. Rep. of Germany

[21] Appl. No.: 933,917

[22] Filed: Aug. 27, 1992

Related U.S. Application Data

[63] Continuation of Ser. No. 640,463, Jan. 11, 1991, abandoned.

[30] Foreign Application Priority Data

Mar. 23, 1990 [DE] Fed. Rep. of Germany ....... 4009379

[51] Int. Cl.$^5$ .................... B60T 8/32; B60T 8/48
[52] U.S. Cl. .................... 303/113.2; 303/116.1; 303/119.1
[58] Field of Search ............... 303/113 TR, 113 TB, 303/116 R, 116 SP, 116 WP, 116 PC, 119 R, 119 SV, 68, 69, 110, 10, 93, 113.2, 113.1, 116.1, 116.2, 116.3, 115.1, 119.1, 119.2, 115.4; 188/181 A; 180/197

[56] References Cited

U.S. PATENT DOCUMENTS

| | | | |
|---|---|---|---|
| 4,395,073 | 7/1983 | Arikawa et al. | |
| 4,826,258 | 5/1989 | Ocvirk et al. | 303/113 TB |
| 4,840,436 | 6/1989 | Burgdorf et al. | 303/113 TR |
| 4,861,118 | 8/1989 | Burckhardt et al. | 303/113 TR |
| 5,013,096 | 5/1991 | Ocvirk et al. | 303/116 R |
| 5,013,097 | 5/1991 | Gutzeit et al. | 303/116 R |
| 5,015,043 | 5/1991 | Resch | 303/113 TR |
| 5,026,124 | 6/1991 | Resch | 303/116 R |
| 5,026,127 | 6/1991 | Arikawa | 303/119 R |
| 5,033,800 | 7/1991 | Willmann | 303/116 R |
| 5,039,176 | 8/1991 | Hellmann et al. | 303/116 R X |
| 5,040,854 | 8/1991 | Arikawa | 303/119 R |
| 5,058,961 | 10/1991 | Mergenthaler et al. | 303/116 R |
| 5,080,450 | 1/1992 | Kirstein | 303/116 R X |
| 5,102,205 | 4/1992 | Stegmaier | 303/116 R X |
| 5,123,716 | 6/1992 | Willmann | 303/116 SP |

FOREIGN PATENT DOCUMENTS

| | | | |
|---|---|---|---|
| 3107963 | 1/1982 | Fed. Rep. of Germany . | |
| 0078857 | 4/1988 | Japan | 303/116 R |
| 0240457 | 10/1988 | Japan | 303/116 R |
| 0119463 | 5/1989 | Japan | 303/116 R |
| 0212652 | 8/1989 | Japan | 303/116 SP |
| 2195724 | 4/1988 | United Kingdom | 303/116 R |
| 2215793 | 9/1989 | United Kingdom | 303/116 R |

OTHER PUBLICATIONS

Bosch, "PKW-Bremsanlagen" (KHNDT.09.89).
Bert. Nr. 1987 722 023 (see copy).
Bosch Technische Berichte, ISSN 0006-789X.

Primary Examiner—Douglas C. Butler
Attorney, Agent, or Firm—Edwin E. Greigg; Ronald E. Greigg

[57] ABSTRACT

A brake system having a master brake cylinder that communicates via brake lines with wheel brake cylinders, a check valve and shutoff valves for the wheel brake cylinders, for anti-skid control, are each incorporated in the master brake lines. A line branches off from the master brake line downstream of the control valve and is adjoined by a return pump, which communicates with the master brake line downstream of the control valve via a return line.

2 Claims, 3 Drawing Sheets

BRAKE SYSTEM

This is a continuation of copending application Ser. No. 07/640,463 filed on Jan. 11, 1991, now abandoned.

BACKGROUND OF THE INVENTION

The present invention relates to a brake system as defined hereinafter.

Such brake systems are well known and described in many publications. As an example, Bosch Technische Berichte [Bosch Technical Reports] of February, 1982, ISSN 0006-789X can be named, page 17 of which mentions the so-called anti-skid braking system ABS 2S.

In this known system, an undamped feedback of the anti-skid control on the brake pedal takes place, and the driver perceives this feedback as unpleasant. German Offenlegungsschrift 31 07 963 already shows a brake system in which a total suppression of the feedback is performed. There, a hydraulic tank receives brake fluid from the wheel cylinders via a control valve, and as a result the brake pressure is lowered. This brake fluid is removed from the hydraulic tank to a reservoir via a fluid pump. However, this arrangement has the disadvantage that the return pump pumps toward a high-pressure reservoir, so the corresponding reservoir chamber must receive the entire volume in the circuit. This causes problems in terms of safety. The pressure reduction is also limited by the spring force of the reservoir; that is, a reduction to very low pressure values, such as 0.5 to 1 bar, is impossible.

OBJECT AND SUMMARY OF THE INVENTION

The present invention, contrarily, has the advantage that if a pressure reduction is desired, the reservoir receives the brake fluid and can be controlled, or if desired evacuated by means of a return pump. At the same time, this return pump can also perform a pressure buildup in the wheel brake cylinders.

Branching off from the master brake line of each individual brake circuit is a line to the control valve, which when anti-skid control occurs provides for the blocking off of the master brake circuit from the master brake cylinder. This line then leads to a reservoir, from which again brake fluid is drawn by means of a return pump and can be fed back into the brake circuit, in other words into the master brake line, downstream of the aforementioned control valve. Accordingly, there is no direct return of brake fluid to the master brake cylinder, so that there is no feedback on the pedal pressure exerted by the driver. A kind of internal regulation inside the brake circuit takes place.

At least one reduction valve must be incorporated into the line upstream of the reservoir, enabling a closing position and an open position in only one direction, namely toward the reservoir. This avoids filling of the reservoir with brake pressure during normal braking without anti-skid control.

In a first exemplary embodiment, the reservoir may be a so-called active reservoir; that is, a suitable reservoir piston is supported in it that can push the stored brake fluid back out again. How this expulsion takes place is of secondary importance; it may be by means of a magnet, electric motor, hydraulic or pneumatic drive mechanism.

If a pressure reduction is desired in this exemplary embodiment, then the corresponding reduction valve opens; but the reservoir is not activated. That is, in this case the reservoir can be filled with brake fluid by reducing the pressure in the wheel brake cylinders, with the reservoir piston deflecting accordingly.

If a pressure buildup is then desired in the wheel brake cylinders, or if return pumping or in other words evacuation of the reservoir is occurring, then this reservoir is activated, and the reservoir piston expels brake fluid, even though the reduction valve is closed. This expelled brake fluid is available upstream of the return pump and is carried by it back into the master brake line, thereby supplying the wheel brake cylinders with corresponding brake fluid.

In another exemplary embodiment, the corresponding return pump should be embodied as self-aspirating, so that an active reservoir is unnecessary. However, in that case, a corresponding buildup valve must be incorporated between the reservoir and the return pump, this valve having a blocking position and an open position. In that case, the reservoir piston is not under pressure; instead, if a pressure buildup is desired, brake fluid is aspirated by the return pump itself from the reservoir and fed into the master brake line. This feeding continues until such time as the reservoir volume is sufficient for the pressure modulation. Also, the brake pedal does not move during this period of time. The return pump pumps only counter to the pressure in the wheel brake cylinder, rather than counter to the pressure in the master brake cylinder, for instance, which substantially reduces the noise. The pressure in the wheel brake cylinders can also be lowered to 0 bar by this arrangement, since the reservoir piston is free-floating.

In another exemplary embodiment of the invention, the reservoir piston is contrarily spring-loaded. Thus, a complete pressure reduction in the wheel brake cylinders cannot be effected, but relatively low values of 0.5 to 1 bar are attained. Naturally, this is dependent on the spring pressure itself.

A reservoir equipped in this way has the advantage, however, that the return pump does not need to be embodied as self-aspirating; instead, brake fluid to be returned by the spring-loaded reservoir piston is present upstream of the return pump. In that case, however, it appears necessary to provide a check valve toward the corresponding reduction valves, so that a return of brake fluid via the reduction valve to the wheel brake cylinder will not take place when the reduction valves are opened and the reservoir is full.

A pressure-limiting valve is also provided in a bypass, so that excess pump volume not received by the wheel brake cylinders can be pumped back into the reservoir chamber.

Preferably, a damping chamber should also be provided in the return line, serving to equalize pressure fluctuations in the return line.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
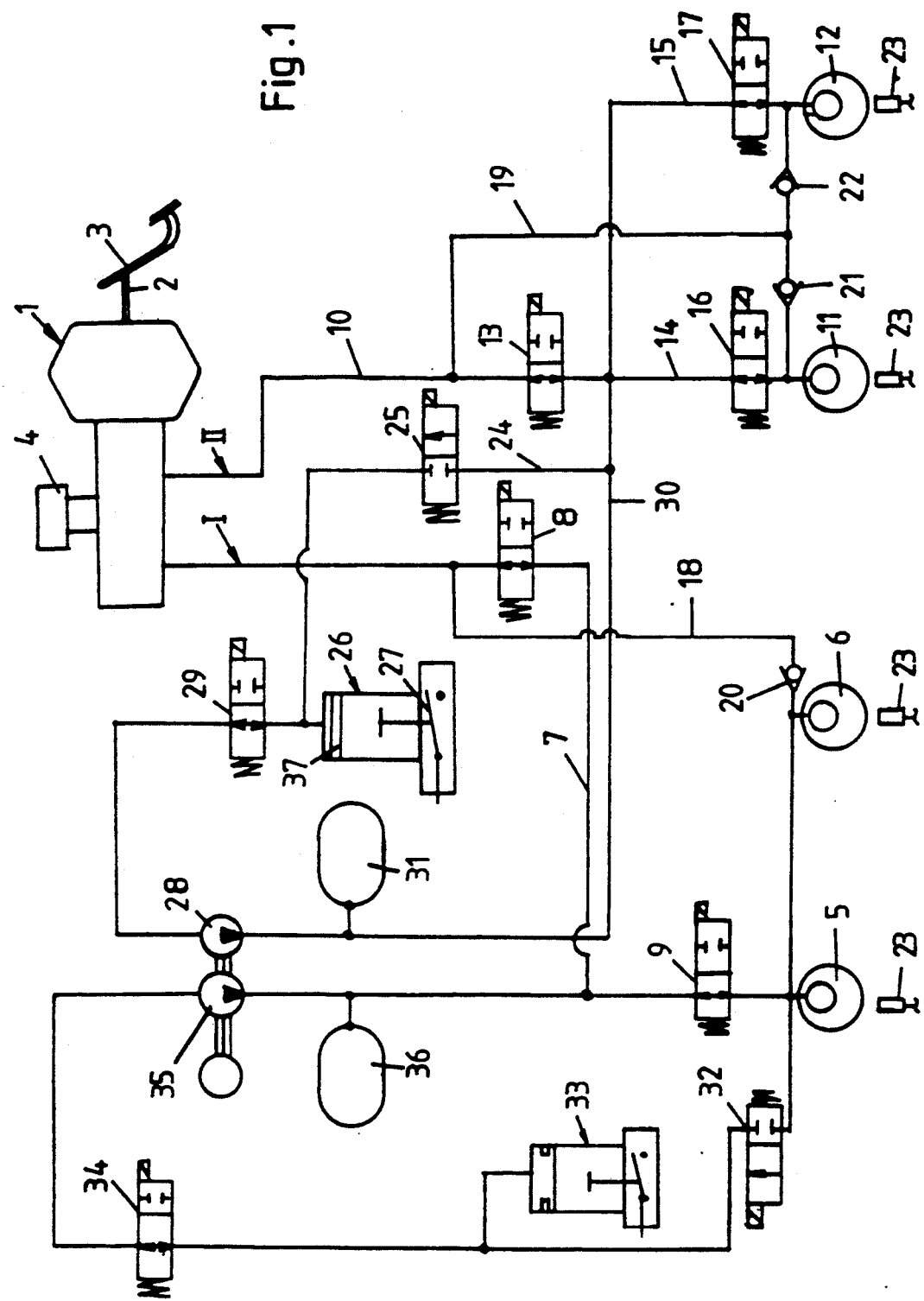
FIG. 1 is a block diagram showing an exemplary embodiment of a brake system according to the invention.

A brake system according to the invention as shown in FIG. 1 has a master brake cylinder 1, which is a commercially available model and may optionally be provided with an additional brake booster. Via a piston rod 2 leading out of the master brake cylinder 1, a brake pressure exerted upon a brake pedal 3 is transmitted to the master brake cylinder 1. Known brake pressure chambers are located in the master brake cylinder 1 and from them, upon imposition of pressure, brake fluid can reach two brake circuits I and II. The supply of brake fluid to the brake system is provided by a suitable supply tank 4, from which brake fluid can reach the brake chambers.

Via the brake circuit I, two wheel brake cylinders 5 and 6 of the left and right rear wheels, respectively, are supplied with brake fluid. However, for this purpose this brake fluid must flow through a first control valve 8 and then through a shutoff valve 9 in a master brake line 7. Both valves 8 and 9 are preferably embodied as magnetic valves and have one flow position and one blocking position. In normal braking, both valves 8 and 9 are switched to the open position, so that upon a pressure buildup in the master brake cylinder 1, brake fluid can reach the wheel brake cylinders 5 and 6.

A control valve 13 is also incorporated into a master brake line 10 of brake circuit II, which leads to wheel brake cylinders 11 and 12 of the left and right front wheels. Downstream of this control valve 13, however, the master brake line 10 branches into one branch line 14 and one brake line 15; a respective shutoff valve 16 and 17 is incorporated into each of these branch lines 14 and 15. Once again the valves 13, 16 and 17 are embodied as magnetic valves and have both an open position and a blocking position. Upon normal braking, the valves 13, 16 and 17 are switched open.

Both the valves 8 and 9 of the rear axle brake circuit and the valves 13, 16 and 17 of the front axle brake circuit can be bypassed by a return line 18 and 19, respectively. Check valves 20, 21 and 22 are incorporated into these return lines 18 and 19; for the wheel brake cylinders 5 and 6 of the rear axle brake circuit, one check valve 20 is sufficient. If a brake pressure in the master brake cylinder 1 is overcome, brake pressure can be reduced in the wheel brake cylinders 5, 6 and 11, 12, respectively, directly via these check valves 20, 21 and 22, bypassing the valves 8 and 9 and the valves 13, 16 and 17, respectively.

It is not shown in detail that the control valves 8, 9 and 13, 16 and 17 communicate with an appropriate control unit for the brake system. Among other signals, this control unit receives pulses from wheel sensors 23, by way of which locking or skidding of a wheel, for instance, is ascertained. As soon as skidding is indicated, anti-skid control is effected; suitable control elements for this are provided in each brake circuit I and II. In brake circuit II, a line 24 branches off between the control valve 13 and the shutoff valve 16 and communicates with a reservoir 26 via a pressure reduction valve 25. The reduction valve 25 is again a magnet valve, which has a blocking position and a unidirectional open position.

The reservoir 26 serves to hold brake fluid upon a pressure reduction in the wheel brake cylinders 11 or 12. In the present exemplary embodiment, it also has a switch device 27, which indicates when the reservoir 26 has attained a certain fill level. For the corresponding control unit, a signal of this switch 27 means that the reservoir 26 must be evacuated, because it cannot hold anymore brake fluid. The evacuation of the reservoir 26 is then effected via a self-aspirating return pump 28; the communication between the reservoir 26 and the return pump 28 can also be broken by a pressure buildup valve 29. This buildup valve 29 is likewise preferably a magnetic valve and has an open position and a blocking position.

The return pump 28 communicates directly with the master brake line 10 between the control valve 13 and the shutoff valve 16 by means of the return line 30. A damper chamber 31 is provided for noise abatement.

In a comparable arrangement, brake circuit I also has a pressure reduction or buildup arrangement, which comprises a reduction valve 32, a reservoir 33, a buildup valve 34, a return pump 35 and a damper chamber 36.

As soon as a wheel sensor 23 indicates skidding of a wheel, an anti-skid control operation takes place. To this end, the communication between the master brake cylinder 1 and the applicable wheel brake cylinder 5, 6, 11 or 12 is interrupted by the control valve 8 or 13. The return pump 28 or 35 also starts up.

If the anti-skid control is for instance performed for the right front wheel, then the shutoff valve 16 for the wheel brake cylinder 11 for the left front wheel is also closed, while contrarily the shutoff valve 17 for the wheel brake cylinder 12 of the right front wheel is opened. At the same time, the reduction valve 25 is also opened, so that a pressure reduction takes place toward the reservoir 26, via the branch line 15 and the line 24. The excess volume of brake fluid in the wheel brake cylinder 12 of the right front wheel is thus received by the reservoir 26.

As soon as the control unit recognizes that the reservoir 26 is full and still further pressure reduction should take place in the wheel brake cylinder 12, which it does either via the switch 27 or possibly via its own logic system, the return pump 28 must aspirate brake fluid from the reservoir 26. This is why the return pump 28 is embodied as self-aspirating. For this to be possible, however, the shutoff valves 16 and 17 must be closed and the control valve 13 must be opened. The reduction valve 25 must also be closed and the buildup valve 29 opened. Once this switching operation has been done, the necessary reduction in the volume of the reservoir 26 can then occur. If the wheel brake cylinder 11 of the left front wheel requires a pressure buildup during this period of time, then it must wait until the reduction has been completed.

The pressure buildup in the wheel brake cylinder 11 of the left front wheel can also be performed by the return pump 28 itself in this case. To this end, the shutoff valve 16 is opened, and the shutoff valve 17 for the wheel brake cylinder 12 of the right front wheel is closed. Closure of the reduction valve 25 and opening of the buildup valve 29 also take place. The wheel brake cylinder 11 can now be acted upon with brake fluid via the return line 30 and the brake line 14.

If the volume of the reservoir 26 is inadequate for a buildup, this is recognized via the control logic, or perhaps again via the switch 27, and the control valve 13 is opened. Brake pressure imposition then takes place once again by means of the master brake cylinder 1.

An advantageous feature here is that the brake pedal remains unmoving or steady as long as the volume in the reservoir 26 is adequate for a pressure modulation. The result is a reduced pedal feedback, and the noises are less, since the return pump pumps only counter to the pressure in the wheel brake cylinders, rather than counter to the pressure in the master brake cylinder. The pressure in the wheel brake cylinders can be reduced to 0 bar, since the reservoir 26, or the reservoir piston 37 present in it, is not spring-loaded.

Figure 2:
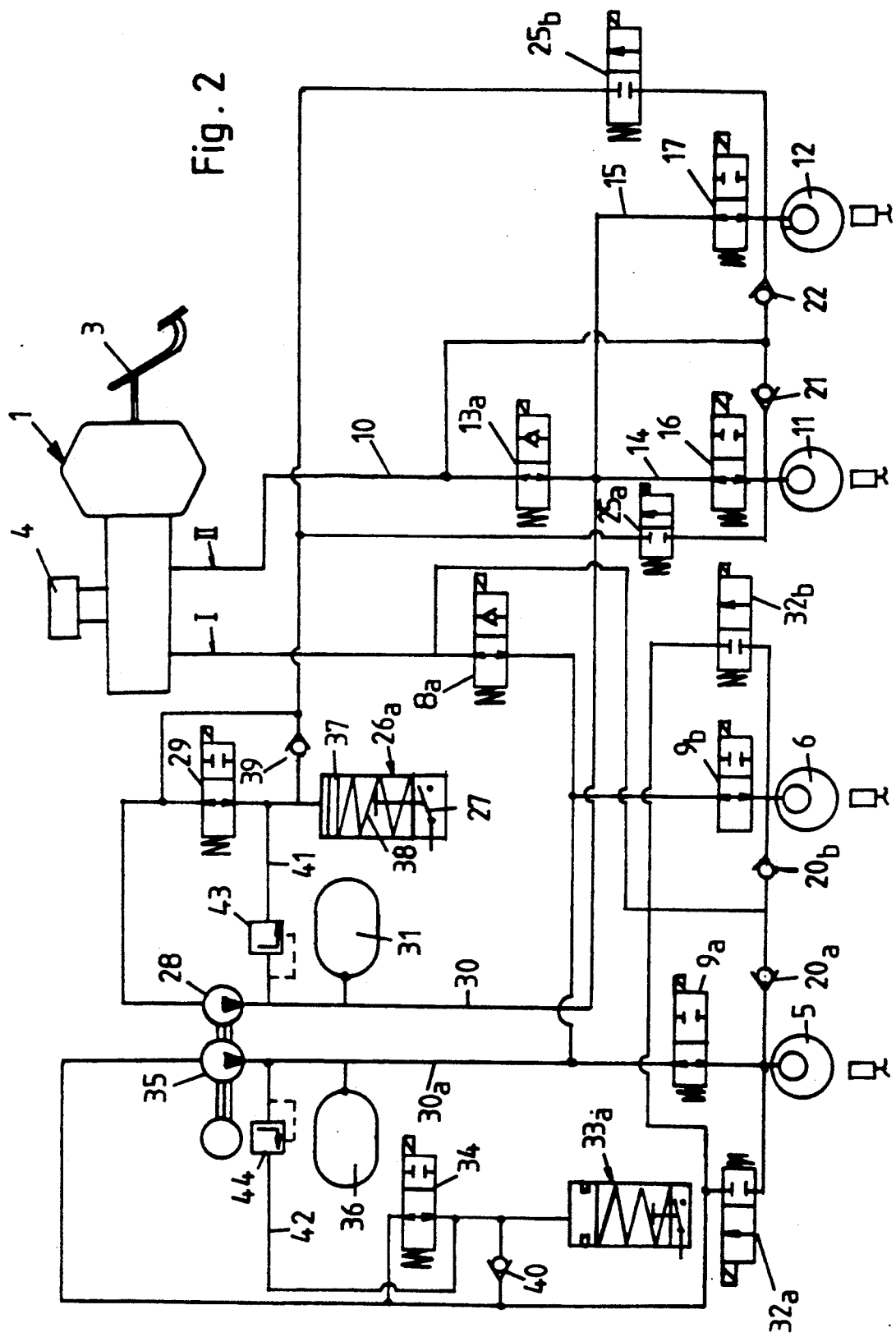
FIG. 2 is a block diagram of a further exemplary embodiment of a brake system corresponding to FIG. 1.

In the exemplary embodiment of a brake system shown in FIG. 2, the return pumps 28 and 35 are not embodied as self-aspirating; instead, the reservoir piston 26a or 33a is subject to the pressure of a spring 38. As a result, a volume of brake fluid is forced out of the reservoir 26a or 33a toward the return pump 28 or 35 when the buildup valve 29 or 34 is opened. To prevent a simultaneous positive displacement of brake fluid toward the reduction valve 25a or 32a, corresponding check valves 39 and 40 are provided. To limit a pressure between the pump and the inlet valve (16, 17, for example), a bypass line 41 and 42 is also provided directly into the line 30 and 30a, respectively, downstream of the respective return pump 28 or 35, and a respective pressure limiting valve 43 or 44 is incorporated into each bypass line.

The brake system of FIG. 2 also differs from that of FIG. 1 in that the two wheel brake cylinders 5 and 6 of the rear axle can be triggered separately. One shutoff valve 9a and 9b is therefore provided for each wheel brake cylinder 5 and 6. Two check valves 20a and 20b and two reduction valves 32a and 32b are also needed here.

If a pressure reduction is desired, the volume of brake fluid from the wheel brake cylinders 5, 6, 11 or 12 is received directly by the reservoirs 26a and 33a, respectively, and simultaneously also supplied to the intake side of the pump 28 and 35, in order to assure that a brake pressure reduction to very low values (0.5 to 1 bar) is possible.

If the road surface has a very low coefficient of adhesion and a certain amount of pedal feedback is acceptable, then the buildup valve 29 and 34 and the associated check valve 39 and 40 can be dispensed with. For the sake of low residual pressures in the wheel brake cylinders 5, 6 and 11, 12 when the coefficients of adhesion are very low, the control valve 8a and 13a, respectively, is opened during the pressure reduction.

If the coefficient of adhesion of the road surface increases during anti-skid control, the volume in the reservoir 26a or 33a can be exhausted, making the pump pressure equal to the pressure in the wheel brake cylinders. Since in the present exemplary embodiment the blocking position of the control valves 8a and 13a is occupied by a check valve, brake fluid can flow in from the master brake cylinder 1. As soon as the reservoir 26a and 33a has no further capacity to hold brake fluid when the coefficient of adhesion of the road surface is decreasing, this is recognized by the switch 27, and the control valve 8a and 13a are opened again.

Figure 3:
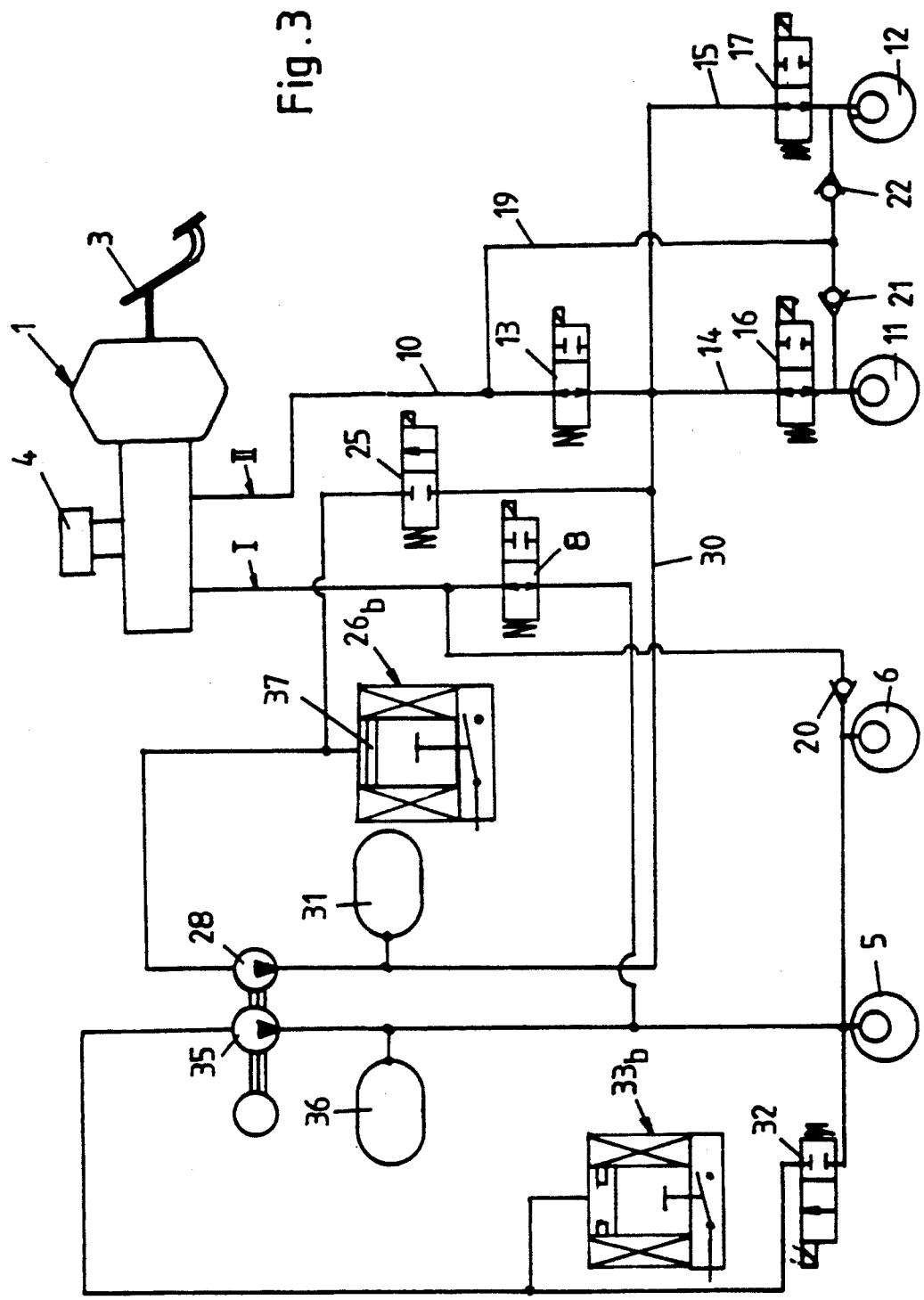
FIG. 3 is a block diagram of still another exemplary embodiment of a brake system according to the invention.

The expenditure for a brake system is reduced considerably if as suggested in FIG. 3 hydraulic multiplexing is used for the front axle and select-low provisions are made for the rear axle. The reservoir 26b or 33b is then embodied as an active ABS reservoir. The reservoir piston 37 is controllably disposed in it, and the reservoir piston 37 is displaceable, either magnetically, by electric motor, hydraulically, or by some such drive mechanism. The reservoir piston 37 effects a charge pressure for the return pump 28 or 35, and prevents pumping by the return pump in the nonactivated state. If a pressure reduction is desired, the reduction valve 25 or 32 is opened, and the reservoir 26b or 33b is not activated, which results in filling of the reservoir 26b or 33b. Not until a pressure buildup via the return pump 28 or 35 is desired is the reservoir 26b or 33b activated, and then brake fluid can flow to the wheel brake cylinders via the return line 30.

By the multiplexing method, as described for instance in U.S. Pat. No. 4,416,347, no pressure buildup at one wheel of the front axle can take place as long as pressure is still being reduced at the other wheel of that axle.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake system comprising a master brake cylinder, a first brake line (I) and a second brake line (II) connected to said master brake cylinder which communicates with first and second wheel brake cylinders (5 and 6) for rear wheels and third and fourth wheel brake cylinders (11, 12) respectively for front wheels, a first control valve (8) in said first brake line upstream of a first shut-off valve (9), said first control valve and said first shut-off valve being in an open position for normal braking, a first check valve (20) in a first by-pass line from said first and second wheel brake cylinders which by-passes said first control valve (8) and said first shut-off valve (9), by which brake pressure in said first and second wheel cylinders (5 and 6) is reduced, said second brake line (II) including a second shut-off valve (16) in a line (14) to said third wheel brake cylinder (11), a third shut-off valve (17) in a line to said fourth wheel brake cylinder (12), a second control valve (13) is provided in a line (10) of said second brake line (II) upstream of said second and third shut-off valves (16 and 17), second and third check valves (21) and (22) in a second by-pass line between said third and fourth wheel brake cylinders which by-passes said second and third shut-off valves (16 and 17) and said second control valve (13) by which brake pressure in said third and fourth wheel brake cylinders (11 and 12) passes for a pressure reduction and pressure buildup, said first shut-off valve (9) is connected to a first branch line which is connected to said first brake line (I), said first branch line extends from said first brake line via a first pressure reduction valve (32) to a first reservoir (33), said first reservoir connects with a first return pump (35) via a first pressure build-up valve (34), said first return pump (35) has a first output line which connects with said first brake line (I) downstream of said first control valve (8); for pressure buildup and reduction in said second brake line (II), a second branch line (24) branches off from said second brake line (II) upstream of said second and third shut-off valves (16 and 17), said second branch line extends to a second reservoir (26) via a second pressure reduction valve (25), said second reservoir connects with a second return pump (28) via a second pressure build-up valve (29), said second return pump has a second output line which connects with said second brake line (II) between said second and third shut-off valves (16 and 17)

and said second control valve (13), each of said first and second pressure reduction valves (32 and 25) and each of said first and second pressure build-up valves have an open position and a blocking position whereby brake pressure on the first and second brake lines (I) and (II) to the first, second, third and fourth wheel brake cylinders is controlled by the first and second pressure reduction valves (32 and 25) to prevent front and rear wheel slide and the pressure in the first and second brake lines (I) and (II) to the respective wheel brake cylinders is controlled by the first and second pressure buildup valves (34 and 29) to prevent the respective wheels from spinning.

2. A brake system as defined by claim 1, which includes a first damping chamber (36) connected with said first output line, and a damping chamber (31) connected with said second output line.

* * * * *